(12) United States Patent
Thomas et al.

(10) Patent No.: US 12,435,729 B2
(45) Date of Patent: Oct. 7, 2025

(54) METHOD FOR MANUFACTURING A COMPRESSOR IMPELLER FOR A TURBOMACHINE

(71) Applicant: SAFRAN HELICOPTER ENGINES, Bordes (FR)

(72) Inventors: Rainer Thomas, Moissy-Cramayel (FR); Laurent Pierre Tarnowski, Moissy-Cramayel (FR); Mathieu Laurent Herran, Moissy-Cramayel (FR); Ludovic André Joël Naudot, Moissy-Cramayel (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 744 days.

(21) Appl. No.: 17/432,382

(22) PCT Filed: Feb. 18, 2020

(86) PCT No.: PCT/FR2020/050295
§ 371 (c)(1),
(2) Date: Aug. 19, 2021

(87) PCT Pub. No.: WO2020/169918
PCT Pub. Date: Aug. 27, 2020

(65) Prior Publication Data
US 2022/0134426 A1    May 5, 2022

(30) Foreign Application Priority Data
Feb. 22, 2019    (FR) ...................................... 19 01794

(51) Int. Cl.
*F04D 29/28*    (2006.01)
*B22F 5/04*    (2006.01)
(Continued)

(52) U.S. Cl.
CPC .............. *F04D 29/284* (2013.01); *B22F 5/04* (2013.01); *B22F 7/08* (2013.01); *B22F 10/25* (2021.01);
(Continued)

(58) Field of Classification Search
CPC .. F04D 29/284; B22F 5/04; B22F 7/08; B22F 10/25; B22F 10/50; B22F 12/53;
(Continued)

(56) References Cited

U.S. PATENT DOCUMENTS

| 2013/0236323 A1* | 9/2013 | Mironets | C23C 24/04 |
| | | | 29/889 |
| 2016/0175983 A1* | 6/2016 | Chivers | F01D 5/34 |
| | | | 219/76.1 |
| 2018/0370117 A1* | 12/2018 | Gardiner | B33Y 30/00 |

FOREIGN PATENT DOCUMENTS

| DE | 10 2014 012 480 A1 | 3/2016 | |
| EP | 3 034 228 A2 | 6/2016 | |
| WO | WO-2015189600 A2 * | 12/2015 | .............. B22F 10/20 |

OTHER PUBLICATIONS

International Search Report issued May 25, 2020 in PCT/FR2020/050295 filed Feb. 18, 2020, 2 pages.
(Continued)

*Primary Examiner* — Ricardo D Morales
(74) *Attorney, Agent, or Firm* — Oblon, McClelland, Maier & Neustadt, L.L.P.

(57) ABSTRACT

A method for manufacturing a compressor impeller or rotor including a hub that carries blades, involving a step of manufacturing a hub which includes all or some of the blades, and a step of additive manufacture by adding localised material using a method such as the LMD process to form or finish each blade.

5 Claims, 2 Drawing Sheets

(51) Int. Cl.
*B22F 7/08* (2006.01)
*B22F 10/25* (2021.01)
*B22F 10/50* (2021.01)
*B22F 12/53* (2021.01)
*B23K 26/342* (2014.01)
*B23K 101/00* (2006.01)
*B33Y 10/00* (2015.01)
*B33Y 80/00* (2015.01)

(52) U.S. Cl.
CPC .............. *B22F 10/50* (2021.01); *B22F 12/53* (2021.01); *B23K 26/342* (2015.10); *B23K 2101/001* (2018.08); *B33Y 10/00* (2014.12); *B33Y 80/00* (2014.12); *F05D 2230/22* (2013.01); *F05D 2230/31* (2013.01)

(58) Field of Classification Search
CPC .. B22F 5/009; B22F 2007/068; B23K 26/342; B23K 2101/001; B33Y 10/00; B33Y 80/00; F05D 2230/22; F05D 2230/31; F05D 2230/14; Y02P 10/25; F01D 5/28; F01D 5/048
See application file for complete search history.

(56) References Cited

OTHER PUBLICATIONS

Preliminary French Search Report issued Sep. 12, 2019 in French Patent Application No. 1901794 filed Feb. 22, 2019, 2 pages (with Translation of Category).

* cited by examiner

METHOD FOR MANUFACTURING A COMPRESSOR IMPELLER FOR A TURBOMACHINE

TECHNICAL FIELD

The invention relates to the manufacture of an axial or centrifugal compressor impeller intended to equip a turbomachine such as a turbojet engine.

STATE OF THE ART

As represented in FIG. 1, a centrifugal compressor impeller 1 is a generally integral part comprising a hub 2 having a revolving shape around an axis AX carrying blades 3. These blades are curved walls with an orientation oblique with respect to the axis AX, spaced apart from one another around the axis AX.

In the case of a centrifugal impeller such as the impeller 1, the hub 2 has an outer face 4 on the air pattern which is axisymmetric, shaped like a bell, which extends from an intake end 6 up to an exhaust end 7 where it generally has an essentially radial shape.

When it is mounted in the turbomachine, the impeller is surrounded by an envelope, which is not represented, called case, having, in turn, a bell-like shape and whose inner face is paralleled by the tops of the blades 3, that is to say their outer edges. In operation, the fluid taken in around the intake end 6 is compressed when passing between the blades 3, and is then discharged substantially radially at the end 7.

As shown in FIG. 1, each blade 3 has a very awkward general shape having an orientation steeply inclined with respect to the axis AX and a twisted shape around an axis normal to the axis AX. Furthermore, these blades 3 have relatively small thicknesses whose law results from an aeromechanical optimisation tradeoff.

Similarly, an axial compressor wheel such as the wheel 9 of FIG. 3 includes, in turn, a hub 11 carrying blades 12 spaced apart substantially evenly around its axis AX. In the case of an axial wheel, the hub has a substantially cylindrical or slightly conical outer face, and the blades 12 are also steeply curved and inclined with respect to the axis AX. In contrast with the centrifugal impeller, in the case of an axial wheel, the fluid is compressed by passing through the blades while being discharged according to an essentially axial direction.

Given the considerable inclinations of the blades, their small spacing and their significantly curved shapes, such a centrifugal impeller or such an axial wheel are manufactured from a blank part made of an alloy such as the blank 8 represented in FIG. 2, which is machined with a computer numerical controlled milling machine equipped with a ball mill cutter.

The optimisation of the performances leads to designing blades having increasingly complex geometries: if the shapes are generally too three-dimensional and feature considerable inclination and twist, the optimisations lead to increasingly exotic shapes, for example with blade tops with a so-called bathtub-like shape and/or with offsets, as well as with leading edges that are heavily worked or reinforced.

But the degrees of freedom of this optimisation are considerably constrained by the manufacturing processes: the manufacture by milling is limited by the spacing of the blades and by their curvatures which penalise access to the intrados and extrados faces. There are other manufacturing processes, but all of them have weakness points: Casting penalises the mechanical characteristics, powder metallurgy is complex and expensive and requires a precision mould, laser additive manufacturing on a powder bed is considerably penalised by the undercut inclinations (downskin) of the faces of the blades as well as by the mechanical characteristics in terms of fatigue.

These manufacturing constraints which limit the optimisation of the blades turn out to be penalising for a centrifugal impeller, but also for an axial wheel or else for a so-called mixed or diagonal impeller.

The invention aims to provide a manufacturing solution allowing extending the range of blade shapes that could be manufactured.

DISCLOSURE OF THE INVENTION

The invention relates to a method for manufacturing a centrifugal or mixed impeller, or an axial wheel of a compressor comprising a hub carrying blades, comprising the steps of:
   provision of a hub devoid of blades or comprising blade bases;
   localised material addition with a nozzle according to a DMD-type additive manufacturing process to form and/or finish a blade;
   at least one relative rotation of the hub relative to the nozzle;
   localised material addition with a DMD-type additive manufacturing process to form and/or finish another blade.

With this solution, it is possible to make any blade shape regardless of their curvature, their stacking and their spacing around the axis of the impeller.

The invention also relates to a method defined this way, wherein one of the localised material addition steps is a step in which the material added to a blade differs from the constituent material of this blade.

The invention also relates to a method defined this way, wherein at least one of the localised material addition steps is a step in which the material is added at a top of a blade, this material being more abrasive than the constituent material of the blade.

The invention also relates to a method defined this way, wherein at least one of the localised material addition steps is a step in which the material is added at a leading edge of a blade, this material being harder than the constituent material of the blade.

The invention also relates to a method defined this way, further comprising a machining and/or polishing step carried out between two localised material addition steps.

The invention also relates to a compressor comprising a centrifugal or mixed impeller, or an axial wheel, manufactured in accordance with a method defined this way.

The invention also relates to a turbomachine comprising a compressor defined this way.

DETAILED DESCRIPTION

The idea underlying the invention is to start from a blank part delimiting at least the hub of the impeller, and to complete this blank part so as to form or complete the blades with a melting/sintering type additive manufacturing process by powder projection or another material feed-in, that is to say by which a localised material addition is carried out.

Unlike additive manufacturing processes on a powder bed such as the SLM process (standing for Selective Laser Melting), melting/sintering processes by projection allow performing localised material additions with a nozzle positioned on the feed-in area, also referred to as BPP (Blown Powder Process). The locally added material may also be fed in the form of a wire to be melted according to the WFP process (Wire Fed Process).

Amongst these localised material addition processes, the LMD (Laser Metal Deposition), sometimes referred to by the registered trademark CLAD standing for Direct Additive Laser Construction, consists in using an equipment set 13 including a nozzle 14 which generates a laser beam 16 and feeds in one or several metallic powder(s) 17, 18 so as to make these powders melt over a substrate 19. During the process, the nozzle is not in contact with the substrate, and it successively deposits layers of a metallic material secured to this substrate.

The molten wires or powders form a deposit over the surface or layer that carries them, which, in turn, is also molten during the process, and several powders of different feed-in metals could be used, where appropriate, to make an alloy with evolving proportions along the height.

Figure 5:
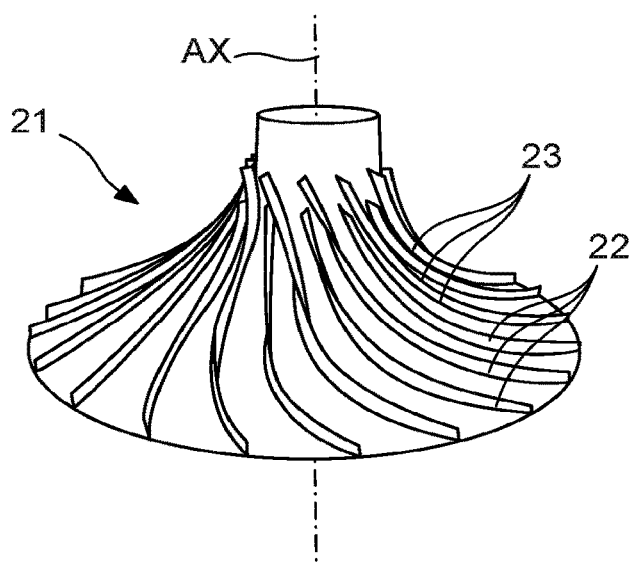
FIG. 5 is an overview of a blank part used for the implementation of the method according to the invention.

The invention consists in manufacturing an impeller starting from a blank part such as the blank part 21 of FIG. 5 having incomplete blade elements in the form of blade bases or totally devoid of blades, and in adding or completing the blade elements 22 of this blank part. For example, the part 21 is obtained by forging and milling in order to guarantee a high level of mechanical characteristics in particular in terms of fatigue, and the local material addition with a melting/sintering type additive manufacturing process by powder projection allows forming complex shapes at the bladings.

Figure 1:
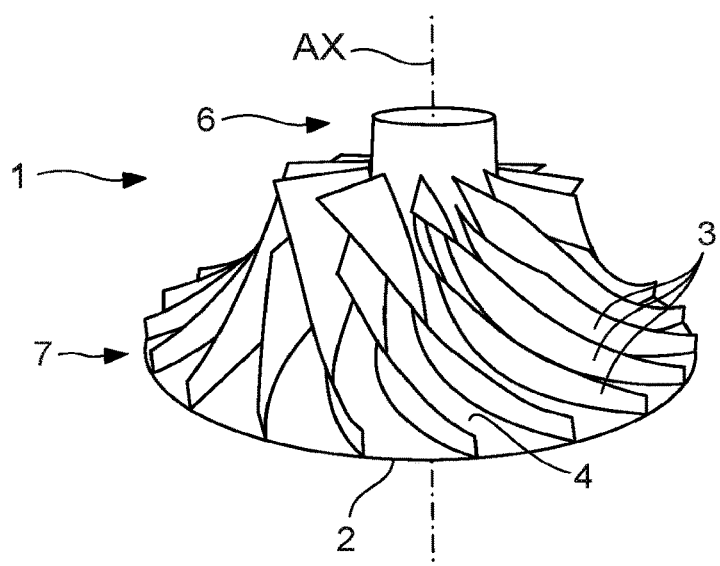
FIG. 1 already described is a perspective overview of a known centrifugal impeller.
Figure 2:
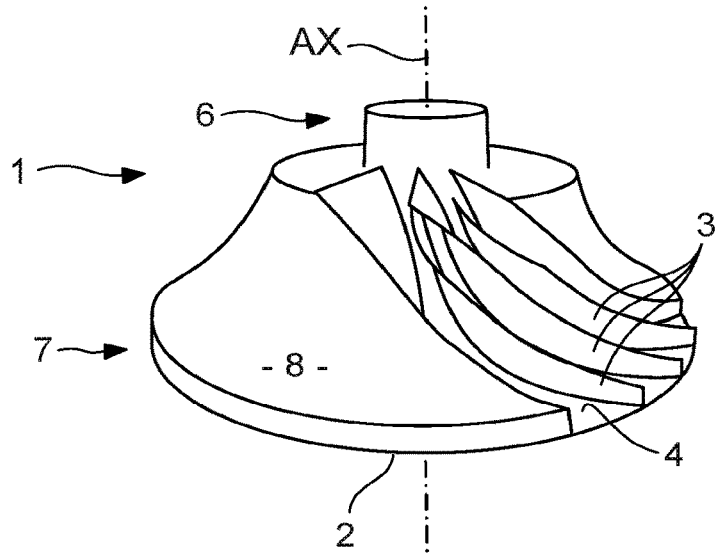
FIG. 2 already described is an overview showing the manufacture of a centrifugal impeller by milling.
Figure 3:
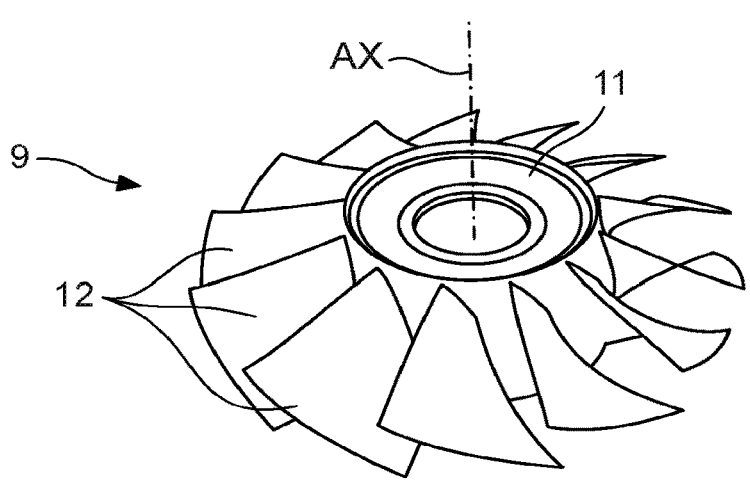
FIG. 3 already described is an overview of an axial wheel.
Figure 4:
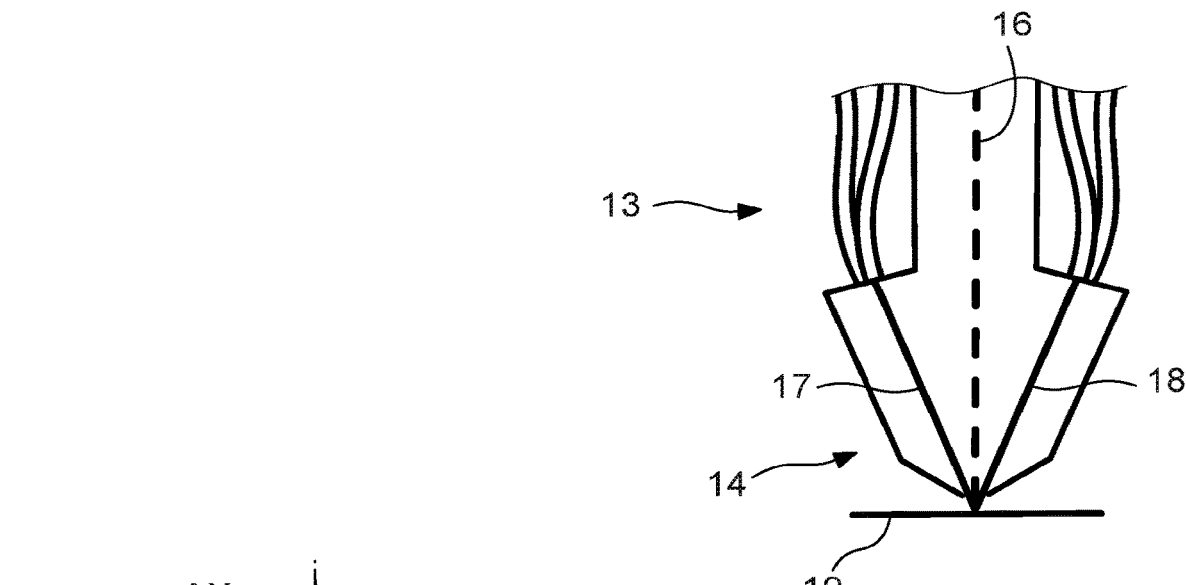
FIG. 4 is a schematic representation of a process for additive manufacturing by localised material addition.

In practice, the nozzle 14 is positioned vertically while being directed downwards like in FIG. 4, and the blank part 21 is displaced relative to this nozzle 14, for example while being carried by a robotic arm.

Thus, it is possible to add material over an external edge 23 of a blade element 22 by positioning this external edge 23 beneath the nozzle 14, and by displacing the part 21 such that the nozzle 14 covers the entire length of this external edge 23 so as to deposit one or several additional material layer(s) therein. Once one or several layer(s) has/have been added over a blade element 22, the part is pivoted about its axis of symmetry AX so as to place the external edge of the next blade element opposite the nozzle 14 in order to proceed in the same manner on this other element.

Thus, the blades of the impeller are built as successive layers: each pass consists in the addition of one or several metal layer(s) over the different blading elements, and the entire impeller is formed on several passes of this type. Thus, accessibility is optimum and identical for the different blade elements throughout the entire process.

This solution further allows touching up the lateral faces of the blades during manufacture thereof, for example to carry out polishing of these faces as building of the latter progresses, that is to say while they are still easily accessible.

In the example of FIG. 5, the blank part 21 includes blade elements 22 which are completed by the additive manufacturing operation to form complete blades. But the blank part 21 could also be totally devoid of blades just consisting of a hub, in which case each blade is entirely formed on this blank part 21 by additive manufacturing. The blank part could also include blades that additive manufacturing could complete for example by adding some material over the leading edges and over the tops of the blades, that is to say their outer edges, the method then essentially consisting of an operation of finishing the impeller.

More generally, the starting point of the construction may be an axisymmetric disk obtained by lathing, or possibly a so-called "3D" milled hub disk, for example made of Titanium or Nickel, or a hub whose outer face already carries substantially complete blade elements such as in the example of FIG. 5.

Figure 6:
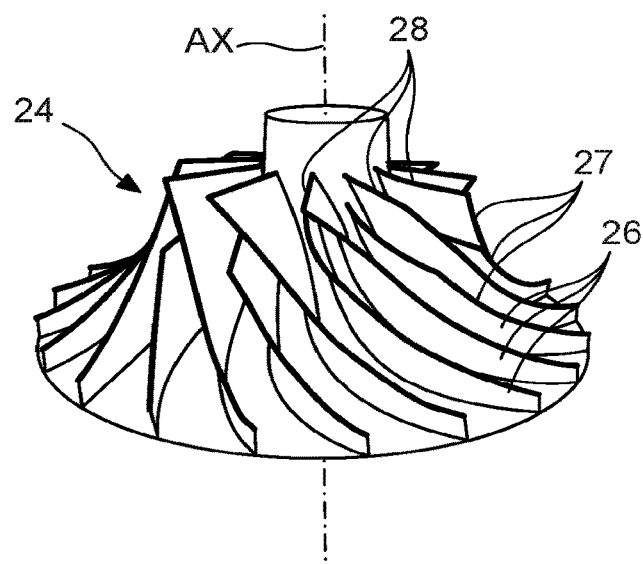
FIG. 6 is an overview of a manufactured centrifugal impeller in accordance with the invention.

Once the operation is completed, the part forms the impeller 24 represented in FIG. 6, which includes complete blades 26. In this example of FIG. 6, each blade 26 further includes a top 27 over which some material has been added by additive manufacturing. Advantageously, this addition over the tops 27 could consist of an abrasive material allowing getting rid of the abradable material usually provided for at the inner face of the case surrounding the impeller when it is operating.

In the case where the impeller is made of titanium, which might catch fire in case of direct contact with the case, the addition of a material other than Titanium at the top of the blade and ideally abrasive with respect to the material of the opposite case allows enhancing the robustness of the impeller to touching: the risk of fire is reduced in case of contact of the blades with the inner face of the case, so that the inner face of the case no longer has to be covered with an abradable material.

In the example of FIG. 6, some material has also been added by additive manufacturing over the leading edges 28 of the blades 26, in this instance an alloy that is harder and/or more resistant to impact erosion than that used to form the body of the blades, so as to have a better resistance to impacts of foreign bodies and/or to erosion by small particles (sand, dust, volcanic ashes . . . ) coming into the compressor.

In the example that has been described, the invention is implemented with the additive manufacturing process by localised material addition LMD (Laser Metal Deposition), but the method according to the invention may be implemented with other additive manufacturing processes by localised material addition. In this context, it is possible to use in particular other processes in the DMD (Direct Metal Deposition) family, for example WFMD (Wire Feed Metal Deposition), or else LMDW (wire-based laser metal deposition).

Moreover, the method according to the invention may advantageously be implemented with a so-called combined machine ensuring both the additive manufacturing operations and milling operations implemented throughout the process of building the blades. In this case, the milling operations are carried out as building of the blades progresses, for example to restore the surface condition of the intrados and extrados faces, or to correct the thickness, as building thereof by additive manufacturing progresses, that is to say while they are easily accessible.

In general, the combination according to the invention of an additive manufacturing process by localised material addition with a displacement of the part relative to the material feed-in nozzle, allows manufacturing blades having geometries that are more complex than is the case with a SLM-type additive manufacturing process on a powder bed.

Indeed, in the case of an additive manufacture on a powder bed SLM, the inclination of the outward faces of the part, that is to say of the undercuts, is limited to a maximum value, beyond which the powder of the deposited bed cannot hold, thereby preventing the formation of the desired geometry.

It is then necessary to look for an orientation of the part ensuring that the undercut angles are small enough. Such an orientation does not exist in the case of a compressor impeller since this consists of a revolving part whose blades define too significant undercuts irrespective of its orientation.

The invention claimed is:

1. A method for manufacturing a centrifugal or mixed impeller, or an axial wheel of a compressor comprising a hub carrying blades, comprising:
   providing a hub devoid of blades or comprising blade bases;
   performing a first localised material addition with a nozzle according to a direct metal deposition (DMD) additive manufacturing process to form at least a portion of a first blade on the hub;
   performing at least one relative rotation of the hub relative to the nozzle;
   performing a second localised material addition with the DMD additive manufacturing process to form at least a portion of a second blade on the hub; and
   performing at least one of machining and polishing between the performing the first localised material addition and the performing the second localised material addition,
   wherein at least one of the performing the first localised material addition and the second localised material addition includes adding material to at least one of the first blade and the second blade which differs from a constituent material of the at least one of the first blade and the second blade, and
   wherein at least one of the performing the first localised material addition and the second localised material addition includes adding material at a leading edge of at least one of the first blade and the second blade that is harder than the constituent material of the at least one of the first blade and the second blade.

2. The method according to claim 1, wherein at least one of the performing the first localised material addition and the second localised material addition includes adding material at a top of at least one of the first blade and the second blade that is more abrasive than the constituent material of the at least one of the first blade and the second blade.

3. The method according to claim 1, wherein a combined machine tool is adapted to alternately implement the performing the first localised material addition, the at least one of machining and polishing, and the second localised material addition.

4. A compressor comprising a centrifugal or mixed impeller, or an axial wheel manufactured in accordance with a method according to claim 1.

5. A turbomachine comprising a compressor according to claim 4.

* * * * *